(12) United States Patent
Awai et al.

(10) Patent No.: US 6,208,828 B1
(45) Date of Patent: Mar. 27, 2001

(54) COMPACT IMAGE FORMING APPARATUS

(75) Inventors: Takashi Awai, Chiba; Nobuo Matsuoka, Yokohama; Yasuhiro Matsumoto, Moriya-machi; Masahiko Yokota, Abiko, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/460,411

(22) Filed: Dec. 13, 1999

(30) Foreign Application Priority Data

Dec. 15, 1998 (JP) .................................................. 10-375426
Dec. 15, 1998 (JP) .................................................. 10-375431
Dec. 15, 1998 (JP) .................................................. 10-375435
Oct. 19, 1999 (JP) .................................................. 11-296895

(51) Int. Cl.⁷ .................................................. G03G 15/00
(52) U.S. Cl. .......................... 399/361; 358/497; 399/107; 399/380
(58) Field of Search ..................... 399/107, 110, 399/111, 124, 125, 362, 377, 380, 361; 347/138, 152; 358/497

(56) References Cited

U.S. PATENT DOCUMENTS

| | | | |
|---|---|---|---|
| 5,185,659 | 2/1993 | Itagaki et al. ......................... | 348/223 |
| 5,790,922 | * 8/1998 | Takano .............................. | 399/107 X |
| 5,812,285 | * 9/1998 | Lin et al. .............................. | 358/497 |
| 5,884,117 | * 3/1999 | Tanoue et al. .................... | 399/110 X |
| 5,918,100 | * 6/1999 | Tanaka et al. .................... | 399/110 X |
| 6,006,064 | * 12/1999 | Hashimoto .......................... | 399/380 |

FOREIGN PATENT DOCUMENTS 5-167754 * 7/1993 (JP) .
7-154517 * 6/1995 (JP) .

* cited by examiner

Primary Examiner—Sophia S. Chen
(74) Attorney, Agent, or Firm—Fitzpatrick, Cella, Harper & Scinto

(57) ABSTRACT

The present invention provides a space-saving and compact high-operability image forming apparatus. The apparatus includes an original reading unit, a sheet supporting unit, an image forming unit and a sheet discharging unit. The original reading unit is adapted to hold an original placed on an original mount by a cover member, for reading an original image. The sheet supporting unit is placed under the original image reading unit, and supports a sheet on which an image is formed. The image forming unit is placed at the rear of the housing containing the original reading unit and the sheet supporting unit and is used to form an image on a sheet held by the sheet supporting unit. The sheet discharging unit discharges a sheet, on which an image has been formed by the image forming unit, towards and above the original reading unit.

34 Claims, 9 Drawing Sheets

COMPACT IMAGE FORMING APPARATUS

BACKGROUND OF THE INVENTION

1. Field of the Invention

The present invention relates to an image forming apparatus having the functions of reading an original image recorded on an original sheet, which is placed on an original mount, and forming an image on a sheet to be conveyed.

2. Description of the Related Art

The art is replete with examples of copiers, printers, facsimiles, and apparatus combining combinations thereof all utilizing an image forming apparatus.

One such known image forming apparatus has flatbed original reading means (a flatbed scanner) for reading the image of an original placed on an original mount. In such apparatus, a pressure plate for holding the original placed on the original mount is adapted to be freely pivotally opened and closed.

Thus, in the general image forming apparatus, the following systems are found. A reading portion disposed at the topmost part of the main unit of the apparatus, an image forming portion placed under the said reading portion, with a recording sheet discharging outlet additionally placed thereunder.

This design, however, has certain numerous drawbacks, described as follows.

When a recording sheet printed or recorded with data is discharged by means of shortening the sheet conveying path in a design such as that common in the aforementioned prior art, a discharged-sheet tray is usually provided on the left or right side thereof, under the reading portion, so as to improve operability. Alternatively, a recording sheet discharged from the image forming portion can be often turned over and discharged between the reading portion and the image forming portion. Thus, in the former case, the discharged-sheet tray protrudes from the left or right side of the apparatus, and in the latter case, the entire apparatus is increased in longitudinal size. In either case, the size of the apparatus is large, an obvious drawback.

Moreover, as part of the maintenance of the image forming portion, a toner cartridge or an ink cartridge is usually exchanged with a new one supplied from an upper part of the image forming portion. It is therefore necessary, in order to facilitate the exchange of the cartridge, to either deviate the image forming portion or the reading portion from the main unit to a place where these elements do not interfere with each other, or to incline one of them. The conventional apparatus thus has another drawback in that the size of its main unit must be increased still more and that doing so is complicated.

Accordingly, a compact image forming apparatus for personal use, to be installed on a desk, has yet to be realized.

SUMMARY OF THE INVENTION

The present invention is accomplished to eliminate the drawbacks of the above described prior art. Accordingly, an object of the present invention is to provide an image forming apparatus, compact enough to be installable on a desk, offering ease of use as well as high operability.

To achieve the foregoing object, the present invention provides an image forming apparatus that comprises original reading means for reading an original image, sheet supporting means placed under said original image reading means, for supporting a sheet on which an image is formed, image forming means for forming an image, placed under said original reading means and said sheet supporting means, and sheet discharging means for discharging a sheet above the original reading means, upon which sheet an image has been formed by the image forming means.

BRIEF DESCRIPTION OF THE DRAWINGS

Numerous other features, objects and advantages of the present invention will become apparent from the following description of preferred embodiments, with reference to the drawings, in which like reference characters designate like or corresponding parts throughout several views, respectively depicting the following.

DESCRIPTION OF THE PREFERRED EMBODIMENTS

In what follows, the preferred embodiments of the present invention will be illustratively described in detail with reference to the accompanying drawings. It should be understood that the scope of the present invention is not limited to the dimensions, materials and shapes of the components of the embodiments, unless so specified.

An image forming apparatus embodying the present invention will be described hereunder with reference to FIGS. 1 and 2.

Figure 1:
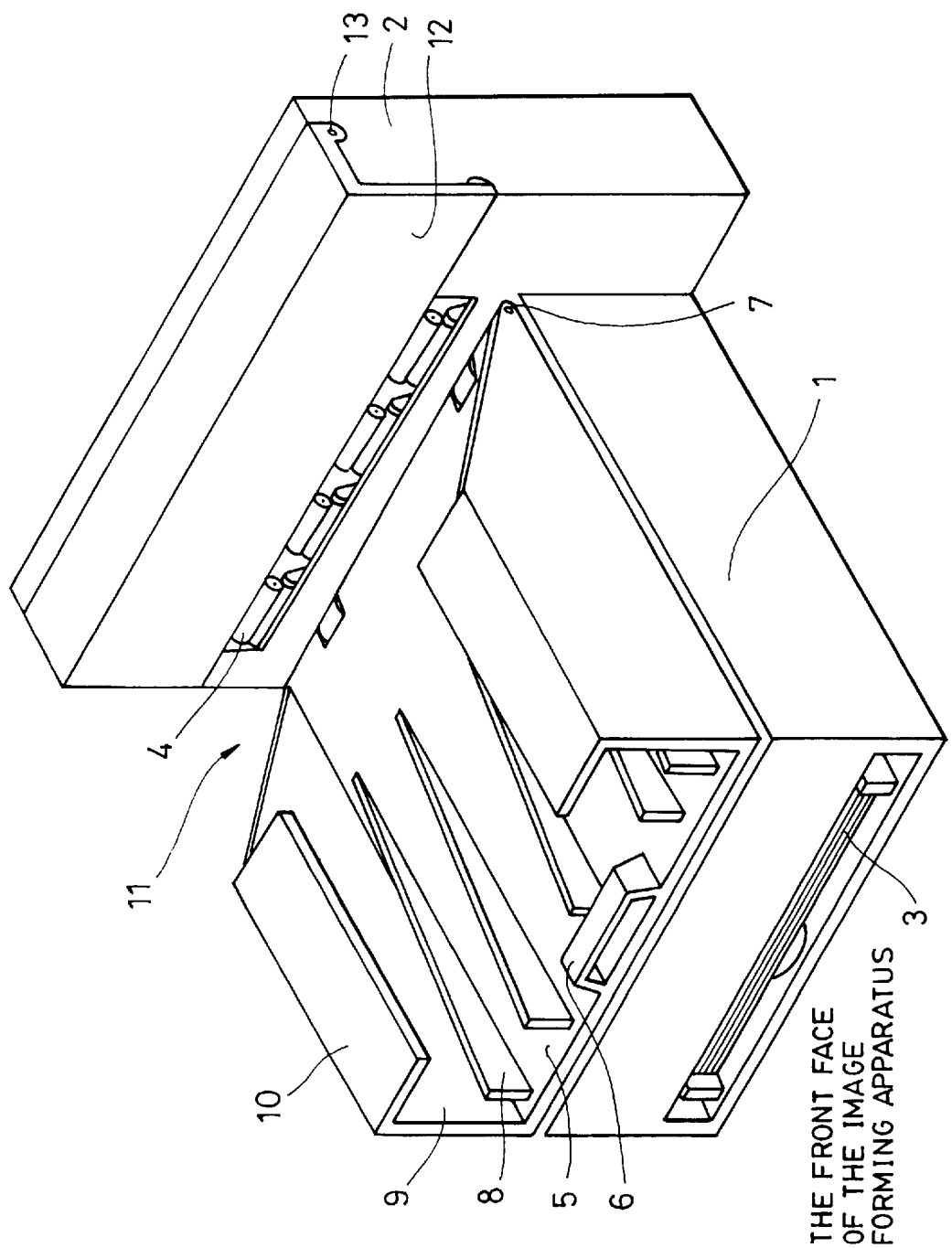
FIG. 1 is a perspective view showing the overall appearance of an image forming apparatus embodying the present invention.
Figure 2:
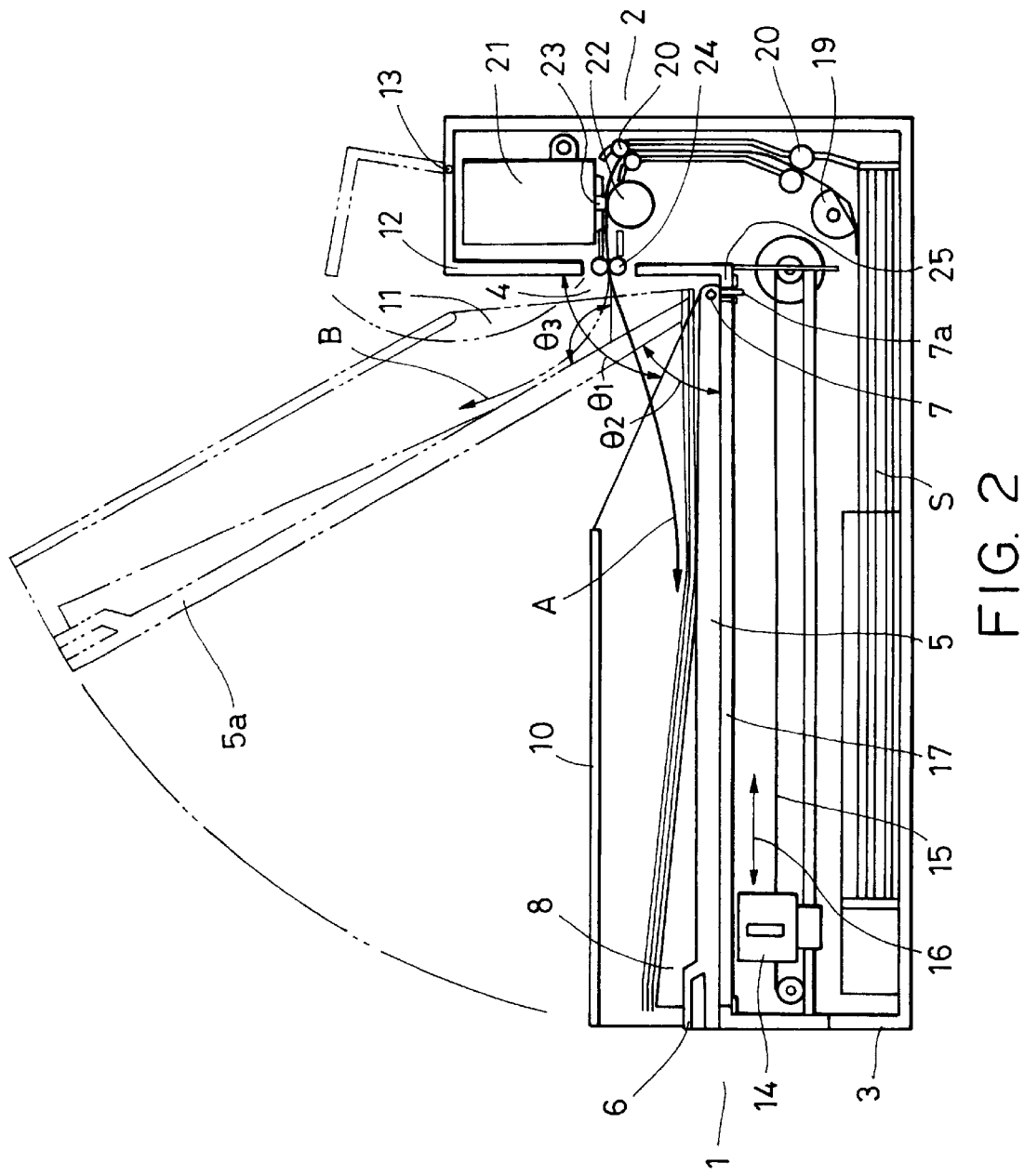
FIG. 2 is a schematic sectional view showing the configuration of the image forming apparatus embodying the present invention.

FIG. 1 is a perspective view showing the appearance of the image forming apparatus embodying the present invention.

The image forming apparatus shown in FIG. 1 comprises an original reading portion 1 of the flatbed scanner type serving as original reading means, and an image forming portion (a recording/printing portion) 2 serving as image forming means to be placed to the backside of the reading portion 1. Further, a cassette (namely, a recording cassette) 3 constituting an unrecorded sheet stacking portion for supporting and accommodating recording sheets S, which can be drawn out to the front face of the apparatus, is provided underneath the original reading portion 1.

Further, a discharging portion 4 is placed above and to the back of a pressure plate 5 acting as a cover member for pressing an original to be read by the original reading portion 1. The reading portion 1, the image forming portion 2, the cassette 3, and the discharging portion 4 are placed in such a manner as to occupy nearly the same position in the lateral direction of the apparatus (i.e. all lying in newly parallel plates).

Incidentally, the pressure plate 5 has the function of covering an original and serves as a recorded-sheet stacking portion (namely, a discharged-sheet tray) for stacking recorded sheets S to be discharged from the discharging portion 4. This respect will now be described in detail as follows.

The pressure plate 5 serving as an original covering member is constructed in such a way as to be able to pivotally rotate towards the back of the apparatus by using a cover hinge 7 as the axis of pivotal rotation. A handle 6 is provided on the front portion of the pressure plate 5. The pressure plate 5 is easily pivotally rotated by raising the handle 6 by hand. Moreover, plural ribs 8 are provided on the top surface of the pressure plate 5. These ribs 8 are formed in such a way as to be inclined by gradually increasing their height in the direction from the back of the apparatus to the front face thereof. Further, the height of the ribs 8 at the front end of the apparatus is set to be greater than that of the handle 6.

Further, wall faces 9 serving as guides along the width direction of the recorded sheets S, stacked on the pressure plate 5, and eaves 10 serving as guides in the height direction thereof are provided on both the left and right sides of the pressure plate 5 at the top of the wall faces 9. The height of the eaves 10 is set to be higher than the maximum height of the ribs 8 at the front end of the apparatus. Furthermore, to insure openings 11 in the eaves 10, the wall faces 9 are inclined in such a manner as to gradually decrease in height in the direction towards the back of the pressure plate 5 and no eaves are provided on said inclined portion of the wall faces. The image forming apparatus 2 is configured so that a recording cover 12 is pivotally rotated about a recording cover hinge 13 serving as its axis of pivotal rotation.

The present invention will next be described, in more detail, with reference to FIG. 2, which is a schematic sectional view showing the image forming device embodying the present invention.

As shown in this figure, an image sensor 14, serving as the original reading means, is fixed to a belt 15 in the original reading portion 1. As a reading drive portion (not shown) drives the belt 15, the contact image sensor 14 is horizontally driven back and forth, as indicated by arrows 16.

A contact glass 17 serving as the original mount is disposed above the contact image sensor 14. An original is set on an original placing surface of the contact glass 17 so that the original surface, on which image information is recorded, is directed downward onto the original placing surface. The image information on the original is then read by the image sensor 14, which performs a reading scan in the directions indicated by the arrows 16. The pressure plate 5, capable of pivotally rotating around the hinge 7, has a surface portion, which contacts with the contact glass 17 and is made of a material such as sponge or urethane foam. Thus, the original is uniformly pressed against the contact glass 17. Further, a member 7a is fitted into a hole 25 bored in the cover for the reading portion, so that the hinge 7 can be slid upward and downward relative to the original reading portion 1.

A pickup roller 19 and feeding rollers 20, which serve as conveying means for sending sheets S accommodated in the recording sheet cassette 3 to the image forming means, are provided in a lower portion of the image forming portion 2. The sheets S accommodated in the recording sheet cassette 3 are sent out in sequence by the rotation of the pickup roller 19, which is driven by a drive portion (not shown). Then, the sheets S are conveyed to the image forming portion 2 by the feeding rollers 20, which are driven by the drive portion.

In the image forming portion 2, the ink jet cartridge 21 is driven in the lateral directions of the apparatus (namely, in the directions perpendicular to the recording sheet conveying direction) on a platen roller 22 by a carriage drive portion (not shown). As the cartridge 21 is driven, a print head 23 discharges ink onto the surface of the sheet. Thus, an image is formed (or printed) on the recording sheet S.

Sheet discharging rollers 24 are provided downstream from the print head 23 in the sheet conveying direction. The printed recording sheet S is discharged in a direction from the sheet discharging portion 4 to the front face of the apparatus by the rotation of the platen rollers 22, which are driven by the drive portion, and of the sheet discharging rollers 24 serving as the sheet discharging means.

The loading and exchanging of the ink cartridge 21 are easily performed by opening and closing a recording cover 12 by an operator, because the recording cover 12 is provided at an upper portion of the image recording portion 2. As illustrated in FIG. 2, the apparatus is constructed so that the recording cover 12 can be opened and closed in such a manner so as not to interfere with the pressure plate 5 and the reading portion 1. Accordingly, the attachment and detachment of the ink cartridge 21 can be freely performed. Thus, both the operability of the apparatus as well as its ease of maintenance are enhanced. Moreover, the replenishment of the recording sheets S can be easily performed by pulling out the recording sheet cassette 3 at the front of the apparatus.

In the case of an embodiment of the present invention, a flatbed scanner (the original reading portion) for reading an original of A4 size is placed on the cassette 3 which can accommodate 100 sheets of A4 sized plain paper as recording sheets. Further, the ink jet based image forming portion 2 is disposed at an upper part of the back side of the apparatus. Moreover, the sizes of the constituent elements of the apparatus are as follows. The front-side width of the main unit of the apparatus is 300 mm. The rear-side width of the main unit of the apparatus is 400 mm. The apparatus has a depth of 450 mm. The height of the pressure plate at the front-side of the apparatus is 130 mm. The height of the image forming portion at the back-side of the apparatus is 250 mm. Thus, the apparatus needs the area corresponding nearly to A3 size as the installation area to be occupied by the apparatus. Consequently, this image forming apparatus can be installed on a desk for private use and operated by an operator even while seated on a chair.

The operations of forming an image as well as discharging and stacking sheets in the image forming apparatus of this embodiment having the aforementioned configuration will be next described in more detail in what follows.

The apparatus comprises the original reading portion 1, the image forming portion 2, and the recording sheet cassette 3, as described above. The apparatus further comprises an apparatus operating portion (not shown) and a control portion (not shown) for transmitting image information to a telephone circuit or a computer and for receiving image information therefrom. Thus, this apparatus can serve as a copier, a facsimile, a printer, and a scanner as well.

First, in the case that the pressure plate 5 of the reading portion 1 is closed, namely, while the image sensor 14 of the original reading portion 1 reads an original, or when the reading portion 1 is not used, the leading edge of a recording sheet S projects from the discharging portion 4 to an upward space, owing to both of the rigidity of the recording sheet S and the difference in height between the discharging portion 4 and the pressure plate 5, just when the discharging portion 4 starts discharging the recording sheet S, on which an image has been formed by the image forming portion 2, onto the top of pressure plate 5. The leading edge of the recording sheet S rests at a level lower than the height of the eaves 10 due to its own weight, and thus sets down onto the top of the pressure plate 5. The discharging of the sheet S is performed without interruption, so that the sheet S slides along the ribs 8 as indicated by an arrow A.

When the trailing edge of the recording sheet S passes between the discharging rollers 24, the trailing edge falls onto the pressure plate 5 owing to its own weight. Thus, the entire recording sheet S is put on the top of the pressure plate 5.

Incidentally, the maximum size of an original read by the apparatus is usually equal to the maximum size of the recording sheet. However, even if the latter is larger than the former, it is sufficient to adjust the interval between the left and right wall faces 9 to the maximum size of the recording sheet. As shown in FIG. 1, the pressure plate 5 is opened at the front of the apparatus. Thus, the recording sheet S is stacked in a state in which the leading edge of the recording sheet S protrudes to the front side of the apparatus along the slopes of the ribs 8.

Additionally, if the difference in height between the discharging portion 4 and the pressure plate 5 is set to be larger than the height of the maximum number of sheets which can be accommodated in the recording sheet cassette 3, no jam can occur in the sheet discharging portion 4, owing to a full load of recording sheets S on the pressure plate 5, even when all of the sheets S filling the recording sheet cassette 3 are printed or recorded with data. Thus, the recording sheets S printed with data and discharged are properly stacked on the pressure plate 5. This eliminates the necessity for providing a discharged-sheet tray in the apparatus, as is commonly done in the prior art. Consequently, the present invention provides a very compact image forming apparatus.

When the pressure plate 5 is raised while the recording sheets S remain stacked thereon, namely, in the case that an original is exchanged when a plurality of copies are produced by keeping the printed recording sheets S stacked on top of the pressure plate 5, the apparatus operates as next discussed.

As described above, the wall faces 9 provided on the left and right sides of the pressure plate 5 are inclined in such a manner so as to have an opened portion 11 towards the back of the apparatus. The wall faces 9 and the eaves 10 are prevented from interfering with the image forming portion 2 and the casing of the apparatus when the pressure plate 5 is opened or closed, by setting an angle $\theta_1$, formed between the inclined portion and the image forming portion 2, to be larger than the maximum opening angle $\theta_2$ of the pressure plate 5.

Furthermore, since the maximum height of the ribs 8 at the front side of the apparatus is set to be larger than the height of the handle 6, even when an operator grasps the handle 6 so as to operate the pressure plate 5 in a state where numerous recording sheets S are stacked on the pressure plate 5, the recording sheets S stacked on the pressure plate 5 do not cover the handle 6. Consequently, the recording sheets S do not hinder or obstruct the operator from grasping or using the handle 6.

Moreover, even when the pressure plate 5 is pivotally raised, as indicated by dashed and dotted chain lines 5a, the recording sheets S held in the space between the eaves 10 and the ribs 8 are prevented from being blown away by any wind force caused by the pivotal rotation of the pressure plate 5. Furthermore, when the next original is set on the original mount and the pressure plate 5 is closed, the recording sheets S are prevented by the eaves 10 from being scattered from the pressure plate 5 owing to wind pressure caused by closing the pressure plate 5.

Therefore, even when the recording sheets, on which images are formed, are stacked on the pressure plate 5, the operations of opening and closing the pressure plate 5 are accomplished as easily as in the case that no sheets S are stacked thereupon, and where there are stacked recording sheets S, they are prevented from being scattered. Thus, good ability to stack the sheets is secured.

Next, descriptions will be given of how the image forming portion 2 operates when the pressure plate 5 is raised, namely, the case that in the middle of an operation of discharging a first recording sheet while multiple originals are being copied, a second original is set on the original mount, or the case that an original to be transmitted is set thereon so as to read data recorded thereon to a memory while information is received and recorded through a facsimile, or finally, the case that the scanner function is used while sheets are being discharged using the printer function.

When the pressure plate hinge 7 is placed under the discharging portion 4 and the pressure plate 5 is raised to the position 5a corresponding to the maximum opening angle $\theta_2$, an angle $\theta_3$ formed between the pressure plate 5 and a line corresponding to a recording sheet discharging angle (in the case of an example illustrated in this figure, a horizontal line) is an obtuse angle. Further, even when the pressure plate 5 is in a state corresponding to the maximum opening angle $\theta_2$, the opened portion 11 of the pressure plate 5 is placed in the vicinity of the discharging portion 4.

Thus, when the leading edge of the recording sheet S is discharged from the discharging portion 4, or even when the leading edge of the recording sheet S sets down onto the pressure plate 5, the leading edge of the recording sheet is conveyed along the ribs 8 on the pressure plate 5, as indicated by the arrow B, so that the recording sheets are stacked in the space between the pressure plate 5 and the eaves 10.

When the trailing edge of the recording sheet S is discharged from the discharging portion 4 by the sheet discharging rollers 24, the trailing edge of the discharged recording sheets falls in the vicinity of the hinge 7. Although this occurs the recording sheet S is guided by the pressure plate 5, the eaves 10, and the wall faces 9 and thus, securely stacked. This does not depend upon whether or not any recording sheets S are already stacked on the pressure plate. Therefore, when the original reading portion 1 is operated, it is unnecessary to consider the operation of the image forming portion 2. Thus, the reliable ability to stack the recording sheets S is always obtained.

In the foregoing description of the embodiment of the present invention, the recording system of the image forming portion 2 using ink jets has been described. However, not limited to any one embodiment, the system may be an electrophotographic recording system using a toner cartridge, a thermal transfer system using an ink sheet, a thermal recording system using thermosensitive recording paper, or the like.

As described above, in the case of the apparatus of the present invention, a recorded sheet stacking portion is provided on the top surface of the pressure plate 5, which is opposite to the original-mount-side surface thereof. This thus eliminates the necessity for providing a stacking portion for stacking recorded sheets S, protruding from the side surface or in the inside of the apparatus. Consequently, a small-sized and compact image forming apparatus is obtained.

Furthermore, according to the present invention, the image forming portion 2 is provided at the back of the apparatus and extended upward, so that the portion 2 does not interfere with the pressure plate 5 or the original reading portion 1. Thus, maintenance of the apparatus is easily accomplished, and as a consequence, the operability of the apparatus is enhanced. The pressure plate 5 is provided in such a manner as to be freely capable of opening and closing relative to the original placing surface of the original mount. Moreover, the sheet S, on which an image is recorded, is led to the recorded sheet stacking portion whether the original placing surface is opened or whether the original placing surface is closed. Thus, because even when an image is being formed, the pressure plate 5 can be opened and closed, operability of the apparatus is enhanced.

The wall faces 9 and the eaves 10 provided in the apparatus serve as guides, preventing the sheets stacked on the top of the pressure plate from going away in either the direction of the width or the height thereof. These guides are designed to work both when the pressure plate 5 is opened as well as when the pressure plate 5 is closed. Moreover, these guides are shaped in such a way as not to hinder the opening or closing of the pressure plate 5. Thus, in either state, the recorded sheets S are conveniently stacked in their proper place.

The ribs 8 provided on the recorded sheet stacking surface of the pressure plate 5 are shaped so that their gradually increases from the back of the apparatus to its front. Moreover, the height of the ribs 8 at the front end of the apparatus is set to be larger than the height of the handle 6 for pivotally raising the pressure plate 5. Thus, even when the recorded sheets S are stacked on the pressure plate 5, the stacked sheets S do not cover the handle 6. Consequently, an operator can easily grasp the handle 6 and pivotally rotate the pressure plate 5 without impediment.

Next, another image forming apparatus, according to a modification of the aforementioned embodiment, will be described with reference to FIG. 3.

Figure 3:
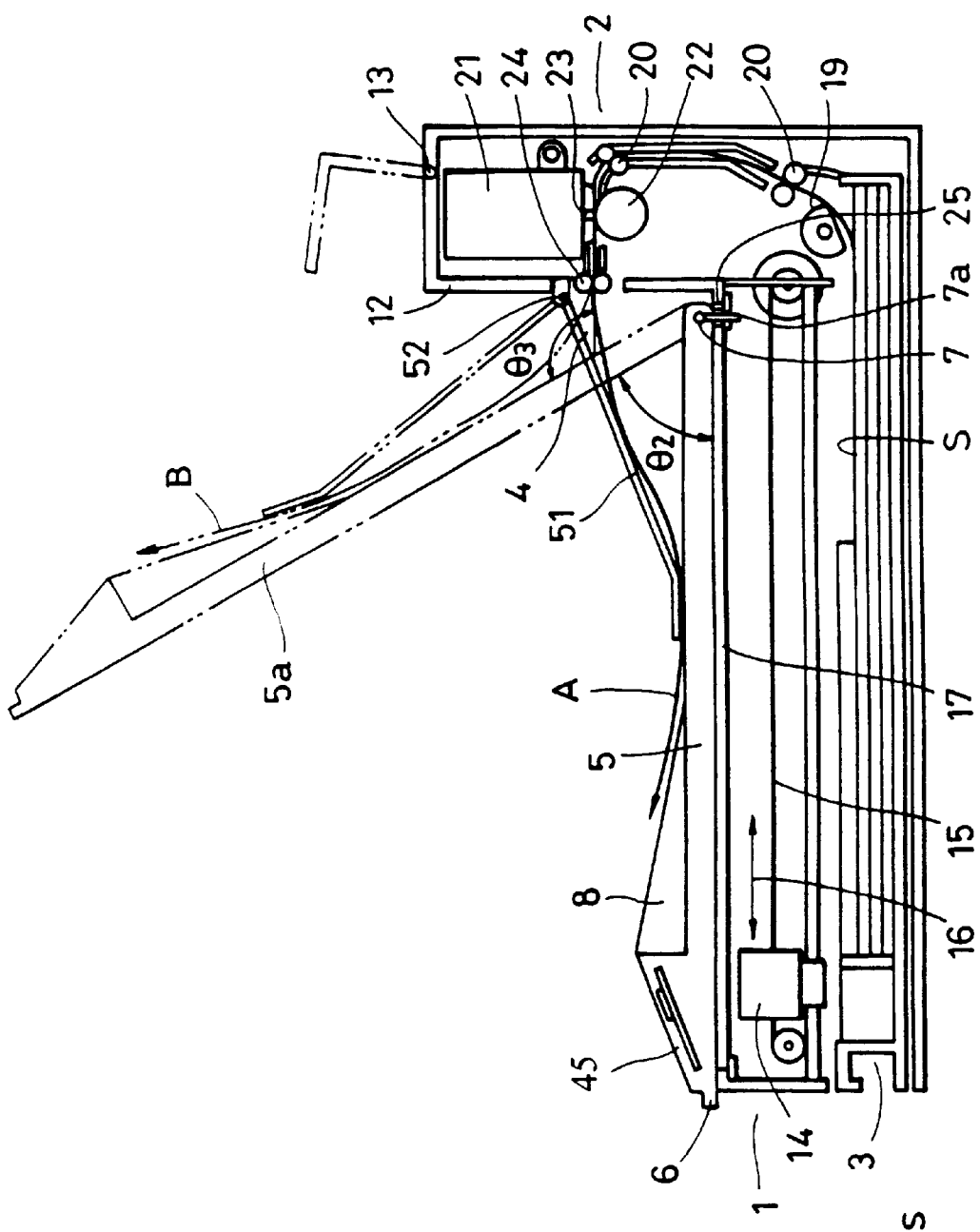
FIG. 3 is a schematic sectional view showing a configuration of a first modification of the image forming apparatus embodying the present invention.

FIG. 3 is a schematic sectional view showing the image forming apparatus according to this modification. In the figure, like reference characters indicate like or corresponding members of the aforementioned embodiment. Thus, the descriptions of such members are omitted herein for brevity.

In this modification, a recording-sheet pushing member 51 is pivotally rotatably attached to an upper portion of the sheet discharging rollers 24 of the discharging portion 4 and under the lower portion of the recording cover 12 by a hinge 52. Said recording-sheet pushing member 51 is made of a high polymer resin having high slidability.

An operating portion 45 is configured in such a way as to be integral with an upper part of the pressure plate 5 serving as the cover member, which is placed at the front of the apparatus. Furthermore, the handle 6 is provided at a frontwise lower part of the operating portion 45. Thus, the pressure plate 5 is pivotally rotated around the pressure plate hinge 7, serving as its axis of pivotal rotation, by grasping the handle 6 and raising the pressure plate 5.

Moreover, multiple ribs 8 are provided on the top surface of the pressure plate 5. The ribs 8 are formed in such a way as to gradually increase their height from the back of the apparatus to its front. Further, the height of the ribs 8 at the front end of the apparatus is set to be equal to or larger than the height of the operating portion 45.

The operating portion 45 is inclined between the position corresponding to the maximum height of the ribs 8 near the front end of the apparatus, and the top surface of the pressure plate 5 at the front of the apparatus so that the height of the ribs 8 at the front end of the apparatus gradually decreases in the direction from their position of maximum height the front of the apparatus. This enables an operator to easily operate the apparatus. Additionally, because of the presence of a space between the leading edge of the recording sheets S discharged from the discharging portion 4 and stacked on the pressure plate 5, and the operating portion 45, an operator can easily grasp the handle 6.

Operation of the recording sheet while actually using this modification, as configured as described above, will be next described in detail.

This image forming apparatus comprises the original reading portion 1, the image forming portion 2, and the recording sheet cassette 3, in a similar manner to the aforementioned embodiment. This apparatus further comprises the control portion (not shown) for transmitting image information to a telephone circuit or a computer and for receiving image information therefrom. This apparatus thus serves as a copier, a facsimile, a printer and a scanner.

First, in the case that the pressure plate 5 of the reading portion 1 is closed, i.e., while the image sensor 14 of the original reading portion 1 reads an original, or while the reading portion 1 is not used, the leading edge of a recording sheet S projects from the discharging portion 4 to an upward space, owing to both the rigidity of the recording sheet S and the difference in height between the discharging portion 4 and the pressure plate 5, just when the discharging portion 4 starts discharging the recording sheet S, on which an image has been formed by the image forming portion 2, onto the pressure plate 5. However, the leading edge of the recording sheet S immediately comes to the bottom surface of a pushing member 51 (namely, the surface thereof facing the side of the pressure plate 5). Then, said leading edge of the recording sheet S slides under the bottom surface of the pushing member 51 as it sets down onto the pressure plate 5. The sheet S goes along the ribs 8 in the direction indicated by the arrow A (of FIG. 3).

The pushing member 51, pivotally and rotatably mounted to the apparatus by the hinge 52 abuts against the pressure plate 5 owing to its own weight. However, the surface of the pushing member 51 formed from the high polymer resin is smooth. Moreover, the recording sheet S has a conveying force and rigidity. Thus, the leading edge of the recording sheet S passes between the smooth bottom of the pushing member 51 and the top of the pressure plate 5.

When the trailing edge of the recording sheet S passes between the sheet discharging rollers 24, its trailing edge falls onto the pressure plate 5 owing to its won weight. Thus, all the recording sheets S stacked on the pressure plate 5 are placed between the pushing member 51 and the ribs 8.

Incidentally, the maximum size of an original read by the apparatus is usually equal to the maximum size of the recording sheet. However, even if the latter is larger than the former this is of no concern, in as much as the pressure plate 5 is opened at the lateral front side thereof. Thus, a recording sheet S is stacked in a state in which the leading edge of the recording sheet S protrudes to the front side of the apparatus along the sloping surfaces of the ribs 8.

Additionally, if the difference in height between the discharging portion 4 and the pressure plate 5 is set to be larger than the height of the maximum number of sheets which can be accommodated in the recording sheet cassette 3, the recording sheets S are stacked in sequence one by one, on the recording sheets S already sitting on the pressure plate 5. Thus, no jam occurs in the sheet discharging portion 4 owing to a full load of recording sheets S being on the pressure plate 5.

Needless to say, at any given time the pushing member 51 is pivotally rotated about the hinge 52 according to the total thickness of the stacked recording sheets S and is gradually raised as new recording sheets are stacked. Thus, the recording sheets S printed with data and discharged are stacked on the top of the pressure plate 5. This eliminates the necessity for providing a discharged-sheet tray in the apparatus, differing from the prior art apparatus which has such a discharge sheet tray on its side.

In what follows, operation when the pressure plate 5 is raised with recording sheets S remaining stacked thereupon, i.e., in the case that an original is exchanged when multiple copies are produced and stacked on the pressure plate 5, will be described.

Moreover, even when the pressure plate 5 is raised, as indicated by the dashed and dotted lines 5a, the pushing member 51 is pivotally rotated about the hinge 52 as the pressure plate 5 rotates about its hinge 7. At that time, the position of the hinge 52 serving as the axis of rotation of the pushing member 51 is higher than that of the pressure plate hinge 7. Thus, the leading edge of the pushing member 51 slides along the top surface of the pressure plate 5 or along the uppermost stacked recording sheet S and moves toward a front-side portion of the pressure plate 5.

During this operation, the recording sheets S stacked on the pressure plate 5 are placed between the pushing member 51 and the ribs 8. Even when the leading edge of the pushing member 51 moves owing to the smoothness of the underside surface of the pushing member 51, (due to its being formed from a high polymer resin), and to the weight of the sheets S, the recording sheets S do not deviate upwardly therefrom. Furthermore, as described above, the contact position, at which the pushing member 51 touches the pressure plate 5, is located towards the front-side of the apparatus. Thus, the stacked recording sheets S are prevented from falling down and scattering.

Further, even when the next original is set on the original mount and the pressure plate 5 is closed, the pushing member 51 pushes the recording sheets S against the pressure plate 5 owing to their own weight. Thus, the recording sheets S are prevented from being scattered owing to wind pressure. Therefore, even when the recording sheets S are stacked on the pressure plate 5, the operations of opening and closing the pressure plate 5 are achieved in an ordinary manner, and the stacked recording sheets S are prevented from being disordered. Thus, good ability to stack the sheets is secured.

What will now be described is how the image forming portion 2 operates when the pressure plate 5 is raised, i.e., the case where, in the middle of an operation of discharging a first recording sheet when a plurality of originals are to be copied, a second original is set on the original mount; or, the case where an original to be transmitted is set on said original mount so as to have data recorded thereon read to a memory while information is received and recorded through a facsimile; or, the case that the scanner function is used while sheets are being discharged as a result of the use of the apparatus printing function.

When the pressure plate hinge 7 is placed under the discharging portion 4 and the pressure plate 5 is raised to the position 5a corresponding to the maximum opening angle $\theta_2$, the angle $\theta_3$, formed between the pressure plate 5 and a line corresponding to a recording sheet discharging angle (in the case of the example illustrated in this figure, a horizontal line), is an obtuse angle.

Because said angle $\theta_3$ is in fact obtuse, even in an initial state where the discharging portion 4 starts discharging the leading edge of the recording sheet S, or in a state where the leading edge of the recording sheet S has already set down onto the pressure plate 5, the leading edge of the recording sheet proceeds along the ribs 8 on the pressure plate 5, as indicated by the arrow B (in FIG. 3), so that the recording sheets are stacked in the space between the pressure plate 5 (more precisely, the ribs 8) and the pushing member 51.

When the trailing edge of the recording sheet S is discharged from the discharging portion 4 by the sheet discharging rollers 24, the trailing edge of the discharged recording sheet falls in the vicinity of the hinge 7. Furthermore, the trailing edges of the stacked recording sheets S fall in the direction of the hinge 7 and the trailing edges of the recording sheets S already stacked on the pressure plate 5 are placed in the proximity of the hinge 7. However, since the recording sheets S are placed between the pressure plate 5 and the pushing member 51, these sheets S are nonetheless securely stacked thereon.

Based upon the foregoing, there is no need for any special concern regarding the operation of the image forming portion 2 when the pressure plate 5 is pivotally raised. Thus, the present invention provides an image forming apparatus having high usability, which can always securely stack the outputted recording sheets S regardless of the position of the pressure plate.

Additionally, the apparatus may have a stopper function for regulating what is termed the maximum pivotal rotation position of the pushing member 51.

Advantageous effects similar to those achieved by this modification can also be obtained by fixing the pushing member 51 between the recording cover 12 and the discharging portion 4 by the use of a high polymer resin sheet and a fixing member, such as pressure sensitive adhesive double coated tape.

Figure 4:
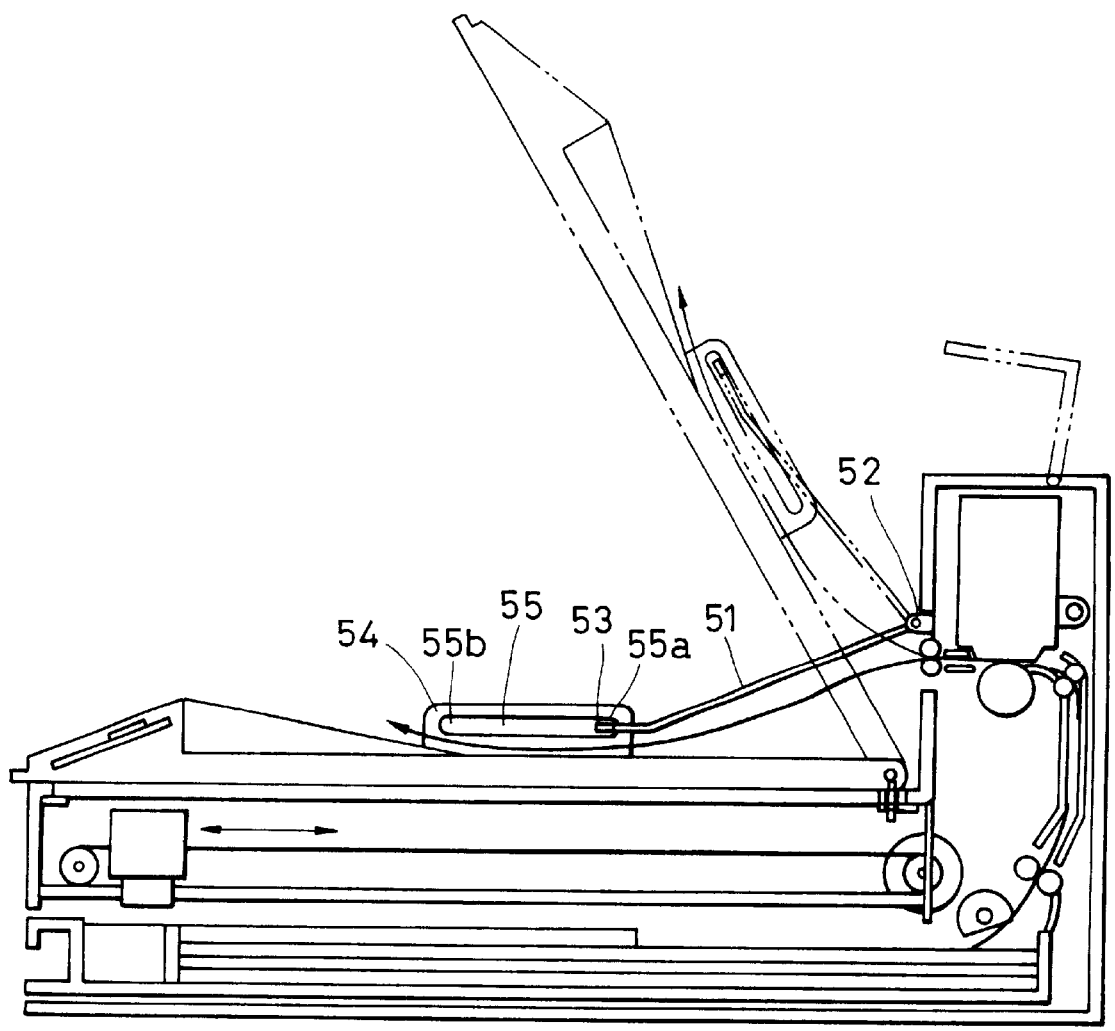
FIG. 4 is a schematic sectional view showing another configuration of the first modification of the image forming apparatus embodying the present invention.

FIG. 4 shows yet another configuration of this modification. An image forming apparatus having this configuration has the constituent components of the aforementioned modification, but is further adapted so that the positioning of a leading edge of the pushing member 51 (opposite to the hinge 52) is performed, as explained below. The rest of the constituent elements and effects are similar to those of the aforementioned modification. In this figure, like reference characters indicate like and corresponding members of the aforementioned modification. Thus, the descriptions of such members are omitted herein for brevity.

FIG. 4 is a schematic sectional view showing said alternate configuration of the image forming apparatus.

In this apparatus, projections 53 are provided on the front-side ends of each of the recording sheet pushing members 51. A groove 55, acting as an engaging portion, is bored in each of walls 54, which serve as support members for supporting the pushing members 51, respectively corresponding to both sides of the pressure plate 5, at an appropriate height from the top surface of the pressure plate 5. The projections 53 are respectively engaged with the grooves 55. Thus, the leading end of each of the pushing members 51 is freely slidably positioned with respect to the pressure plate 5.

As illustrated in FIG. 4, when the pressure plate 5 is closed, the projections 53 are placed towards the back side 55a of the apparatus, i.e., at the part of the groove 55, which is located at the side towards the discharging portion 4. On the other hand, when the pressure plate 5 is raised to its maximum opening position, as indicated by the dashed and dotted lines, each of the projections 53 is placed at a front-side position 55b in the corresponding groove 55. With such a configuration, a space between the pressure plate 5 and the pushing member 51 is always provided. When the pressure plate 5 is pivotally raised, the pushing member 51 operates by being linked with the pivotal rotation of the pressure plate 5. Thus, the recording sheet S is securely stacked on the pressure plate 5, independent of whether or not the pressure plate 5 is opened or closed.

In the foregoing description of this apparatus, the recording system of the image forming portion 2 using ink jets has been described. However, the system may alternatively be an electrophotographic recording system using a toner cartridge, a thermal transfer system using an ink sheet, a thermal recording system using thermosensitive recording paper, or the like.

As described above, this modification has the pushing member 51 for pushing the sheets stacked on the pressure plate 5. Thus, this modification prevents scattering or other disordering of the stacked sheets owing to the pivotal rotation of the pressure plate 5. As well, this modification prevents the recording sheets S from falling down.

Furthermore, in this modification, the grooves 55 are provided in the wall surfaces 54 so as to freely slidably support an end portion of the pushing member 51, being opposite to its other end portion which is attached to the hinge 52. Thus, the ability to stably stack sheets is maintained by engaging the leading end of each of the pushing members 51 in the corresponding groove 55.

Next, with reference to FIG. 5, a second modification of the image forming apparatus embodying the present invention will be described.

Figure 5:
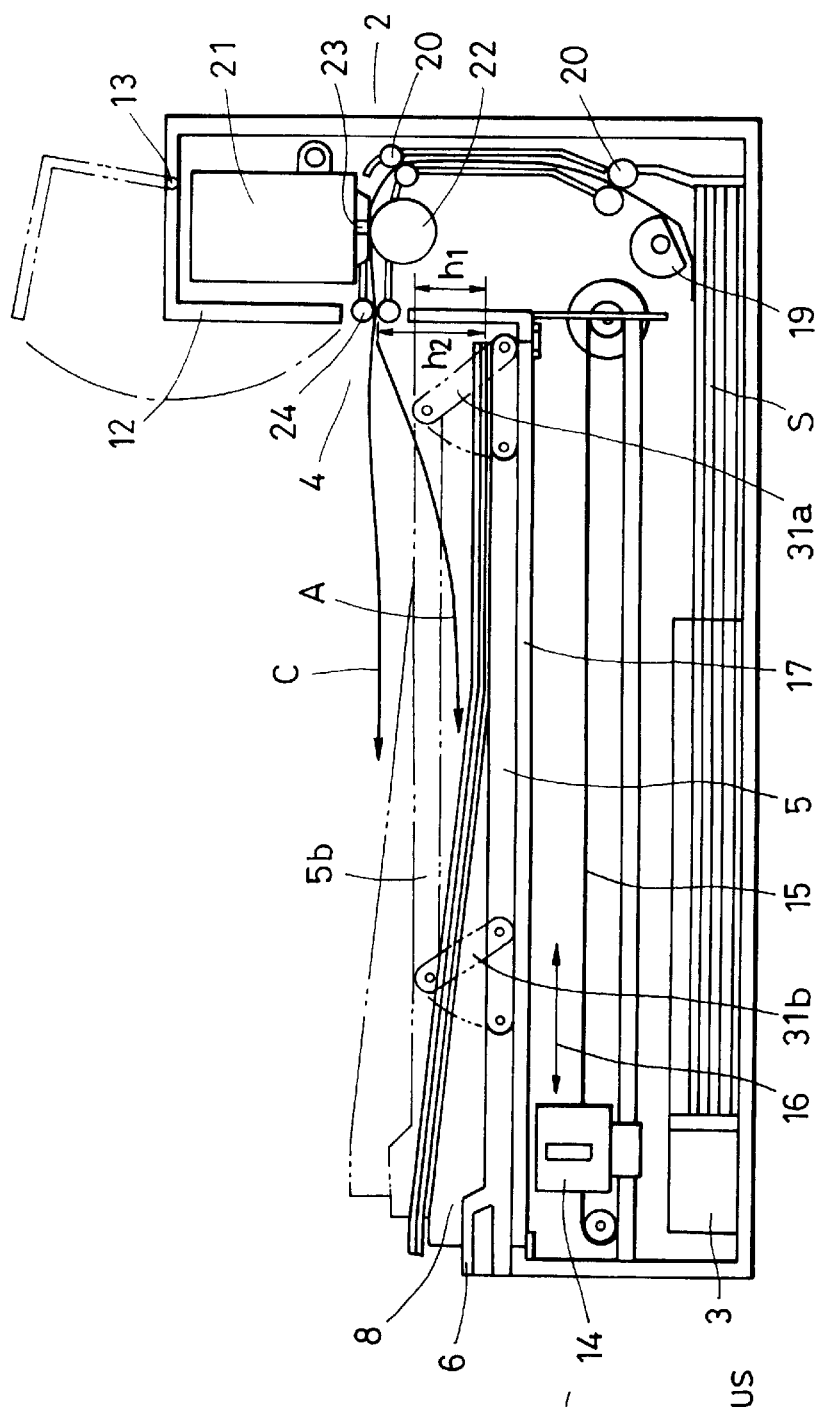
FIG. 5 is a schematic sectional view showing a configuration of a second modification of the image forming apparatus embodying the present invention.

FIG. 5 is a schematic sectional view showing an image forming apparatus according to this modification. As before, in this figure, like reference characters indicate like or corresponding members of the aforementioned embodiment of the present invention. Thus, the descriptions of such members are omitted herein for brevity.

The pressure plate 5 serves as both a means for covering an original, and as a recorded-sheet stacking portion for stacking sheets, upon each of which an image has been formed, on the surface thereof which faced the original mount. Moreover, links 31a and 31b for supporting the pressure plate 5 are attached to the pressure plate 5 and the casing of the reading portion 1 at both end portions thereof, respectively.

Furthermore, the handle 6 is provided at a front portion of the pressure plate 5. When the handle 6 is pulled upwardly, the pivotal rotation of the link 31 causes the top surface of the pressure plate 5 to move while simultaneously maintaining its horizontal orientation. Furthermore, the length of the arm of each of the links is set so that the height $h_1$ of the back of the pressure plate 5 at its maximum possible opening is not greater than the height $h_2$ of the discharging portion 4 relative to the height of the top of the pressure plate 5 at its fully closed portion.

Now, the operation of a recording sheet in this modification, and having the aforementioned configuration, as actually accomplished, will be described in more detail. The apparatus according to this modification comprises the original reading portion 1 and the image forming portion 2, as described above. This apparatus further comprises an apparatus operating portion (not shown) and a control portion (not shown) for transmitting image information to a telephone circuit or a computer and for receiving image information therefrom. Thus, this apparatus is capable of serving as a copier, a facsimile, a printer and a scanner.

First, in the case that the pressure plate 5 of the reading portion 1 is closed, i.e., when the image sensor 14 of the original reading portion 1 reads an original, or when the reading portion 1 is not used, the leading edge of a recording sheet S projects from the discharging portion 4 to an upward space (owing to both the rigidity of the recording sheet S as well as to the difference in height between the discharging portion 4 and the pressure plate 5), just when the discharging portion 4 starts discharging the recording sheet S, (on which an image has been formed by the image forming portion 2), onto the pressure plate 5. However, the leading edge of the recording sheet S falls due to its weight, and sets down onto the top of the pressure plate 5. The discharging of the sheet S is performed without interruption, so that the sheet S goes along the ribs 8 as indicated by the arrow A (of FIG. 5). When the trailing edge of the recording sheet S passes between the discharging rollers 24, the trailing edge then falls onto the pressure plate 5. Thus, the entire recording sheet S is placed upon the pressure plate 5.

Incidentally, the maximum size of an original read by the apparatus is usually equal to the maximum size of the recording sheet. However, even if the latter is larger than the former, since the pressure plate 5 is opened at the lateral front side thereof, the recording sheet S is therefore stacked such that the leading edge of the recording sheet S protrudes to the front side of the apparatus along the sloping surfaces of the ribs 8.

Additionally, if the difference $h_2$ in height between the discharging portion 4 and the pressure plate 5 is set to be larger than the height of the maximum number of sheets which can be accommodated in the recording sheet cassette 3, the recording sheets S are stacked in sequence upon the sheets already stacked on the pressure plate 5, even when a plurality of sheets already printed or recorded with information are stacked thereon. Thus a jam, e.g. a sheet jam, does not occur in the sheet discharging portion 4 owing to a full load of recording sheets S being on the pressure plate 5, even when all of the sheets S filling the recording sheet cassette 3 have been already printed or recorded with data and stacked. Thus, the recording sheets S printed with data and discharged are properly and conveniently stacked on the pressure plate 5, eliminating the need for providing a discharged-sheet tray in the apparatus, as opposed to the usage in the prior art apparatuses.

In what follows, descriptions will be given of operations while the pressure plate 5 is upwardly opened with recording sheets S stacked thereon, i.e. in the case that an original is exchanged when a plurality of copies, i.e. are the printed recording sheets, are stacked on the pressure plate 5, or, alternatively, in the case that a thick original, such as a book, is read.

As described above, the length of each of the arms of the links 31a and 31b is set so that the height $h_1$ of the back of the pressure plate 5 is not higher than the height $h_2$ of the discharging portion 4 (relative to the tope of the pressure plate 5 in its fully closed position), even when the pressure plate 5 is maximally moved by use of the links 31a and 31b. Thus, the pressure plate 5 does not interfere with the discharging portion 4. Furthermore, the height of the front-side portion of each of the ribs 8 is greater than the height of the handle 6. Thus, even if the recording sheets are stacked on the pressure plate 5, the recording sheets S do not cover the handle 6 when an operator needs to grasp the handle 6 so as to operate the pressure plate 5.

Thus, even when the recording sheets are stacked on the pressure plate 5, the operations of opening and closing the pressure plate 5 are achieved in an ordinary manner. The stacked recording sheets S are prevented from being disordered, and the full ability to stack the sheets is thus provided at all times.

Descriptions will now be given of how the image forming portion 2 operates when the pressure plate 5 is raised, i.e., when in the middle of discharging a first recording sheet while multiple originals are being copied, a second original is set on the original mount; or when an original to be transmitted is set thereon so as to read data recorded thereon to a memory while information is received and recorded through a facsimile; or when the scanning function is used while sheets are discharged using the printer function.

In these instances, when the aforementioned pressure plate 5 is in the position 5b, the recording sheets S are discharged from the discharging portion 4 onto the top of the pressure plate 5, as indicated by the arrows C (in FIG. 5). Thus, full ability to stack the discharged sheets is maintained. Accordingly, when the original reading portion 1 is operated, it is unnecessary to consider the operational conditions of the image forming portion 2. As a result, the ability to stack the recording sheets S is always reliably obtained.

In the foregoing description of this modification, the lengths of each of the arms of links 31a and 31b have been described as being equal. Practically, however, even if the length of the arm of link 31b is set to be longer than that of the arm of link 31a, or even if modification has only the link 31a placed at the side of the back of the pressure plate 5, advantageous effects similar to those aforementioned are obtained. Moreover, full operability in connection with placing or exchanging an original is obtained.

Figure 6:
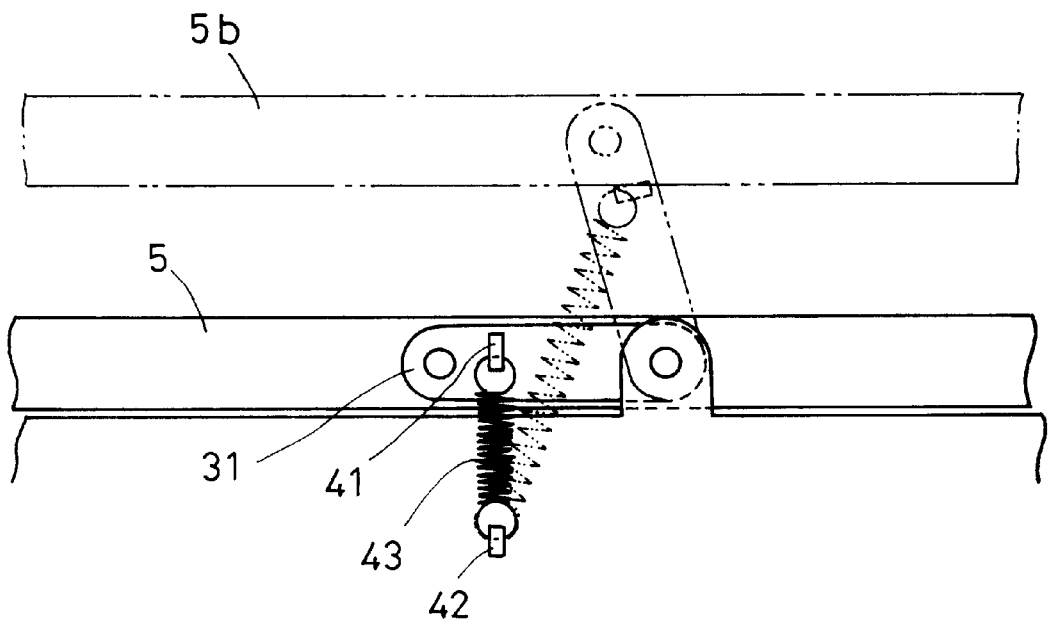
FIG. 6 is a schematic sectional view showing a configuration of a link member of the second modification of the image forming apparatus embodying the present invention.
Figure 7:
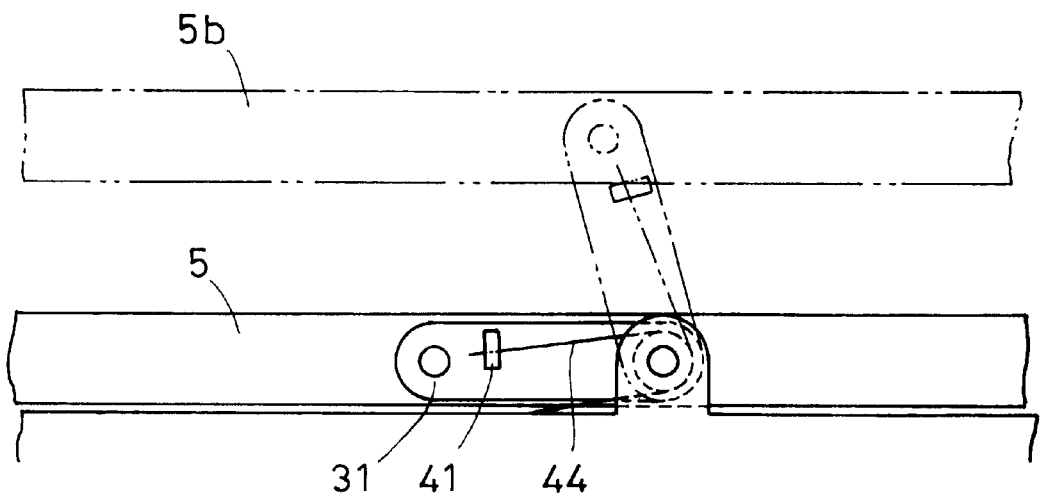
FIG. 7 is a schematic sectional view showing another configuration of the link member of the second modification of the image forming apparatus embodying the present invention.

Furthermore, not only may the function of supporting the pressure plate 5 be imparted to the links 31a and 31b but also that of providing a pushing force for holding an original in flush contact with the pressure plate 5 as well. The configuration of the apparatus adapted in such a manner will now be described with reference to FIGS. 6 and 7.

As shown in these figures, such a configuration is obtained simply by incorporating a coil spring 43 (see FIG. 6) or a hinge spring 44 (see FIG. 7) into a portion consisting of the link 31 and spring latching portions 41 and 42. In such a configuration, the raised pressure plate 5b is subject to a downward force acting to return it to its initial position. I.e. resilient force of the spring 43 or 44 acts so that the pressure plate 5b securely holds an original to be read. Thus, a corrugated original, or an original consisting of two attached pages, e.g. a book, can be securely held on the contact glass 17.

Furthermore, the links 31a and 31b may be adapted to be able to be freely attached and detached so as to facilitate the cleaning and maintenance of the apparatus. Especially, if the frontward link 31b is configured in such a manner as to be freely attached and detached, the operator can easily perform such cleaning and maintenance operations even which seated.

Regarding the link 31a at the rear side of the pressure plate 5, a part of each of a pivotal-rotation fulcrum and the pressure plate 5 may be formed in such a way so as to be so thin that the pivotal-rotation fulcrum and the pressure plate 5 are freely bent. Alternatively, a second original cover and the pivotal-rotation fulcrum may be used and connected to each other.

In this modification it has been described that an ink jet type system is employed as the recording system of the image forming portion 2. However, the system may equivalently be an electrophotographic recording system using a toner cartridge; a thermal transfer system using an ink sheet; a thermal recording system using thermosensitive recording paper, or the like.

Additionally, the pushing member 51 used in the aforementioned first modification may be used as well in the second modification.

As described above, this modification, in such a configuration, has the following primary effects. As a result of supporting the pressure plate 5 in such a way as to be able to move it so that when the pressure plate 5 is opened, it maintains near horizontally, the stacked sheets S, recorded with information and sitting on top the pressure plate 5, not fall off of the pressure plate 5 even when the pressure plate 5 is so moved. Thus, operability is enhanced.

Figure 8:
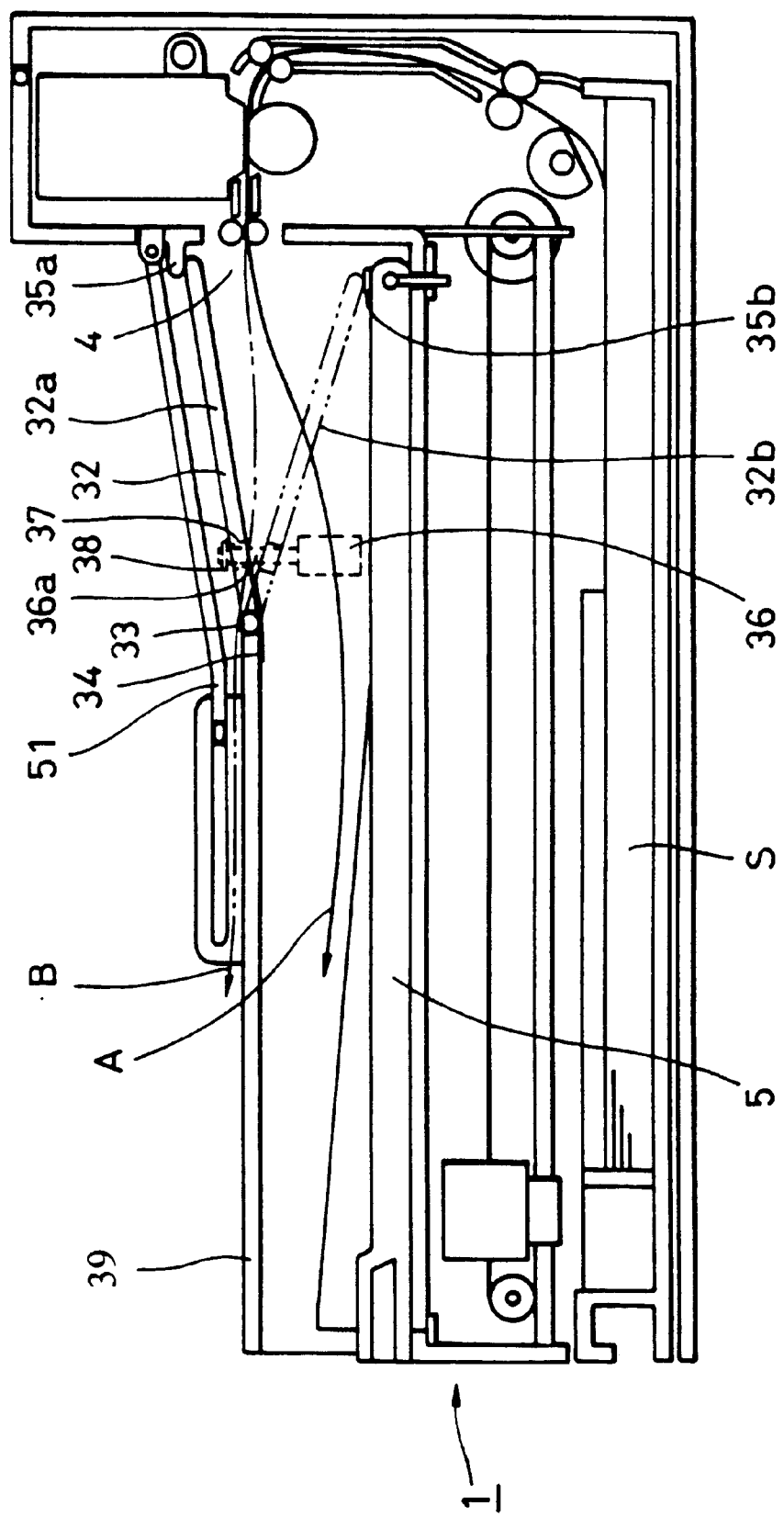
FIGS. 8 and 9 are schematic sectional views each showing a configuration of a third modification of the image forming apparatus embodying the present invention.

Finally, an image forming apparatus according to a third modification of the embodiment of the present invention will be described below with reference to FIGS. 8 and 9. FIG. 8 is a schematic sectional view showing the configuration of an image forming apparatus according to this modification. Incidentally, in this figure, like reference characters designate like or corresponding members described in the foregoing description of the aforementioned embodiment and modifications. Thus, the descriptions of such members are omitted herein for brevity.

The image forming apparatus shown in FIG. 8 comprises a sheet tray 39 of which one or both of lateral side portions are supported on the pressure plate 5. A flapper 32 serving as a pivotally rotating tray capable of pivotally rotating with respect to a stationary tray portion fixed on the pressure plate 5 is provided in the sheet tray 39 at the side facing the sheet discharging portion 4. The flapper 32 is adapted to be able to pivotally rotate about the axis 33 of pivotal rotation within a range between a first position 32a, as indicated by solid lines in FIG. 8, and a second position 32b as there indicated by the dashed and dotted lines.

Usually, the flapper 32 is pressed toward the first position 32a by the hinge coil spring 34 serving as a spring member. The leading end portion of the flapper 32 abuts against a stopper 35a and stands still thereat. Therefore, the sheet S, on which an image has been formed by the image forming portion, is conveyed from the sheet discharging portion 4 through the conveying path indicated by the arrow A to the pressure plate 5 and is then stacked on the pressure plate 5.

On the other hand, a solenoid 36 is placed on either the left or right hand sides of the pressure plate 5 beyond the range of sheet width at the sheet stacking position. The iron core 36a of the solenoid 36 is inserted into a hole 37 provided at the flapper 32, also beyond the range of sheet width. Further, an E-ring 38 is used as a stopper to prevent the iron core 36a from slipping off of the hole 37. When the flapper 32 is placed at the first position 32a, the solenoid 36 is in a free state. I.e., the iron core 36a is in an expanded state, and the solenoid 36 is in an off-state.

When the solenoid 36 is energized and put into an on-state, the iron core 36a contracts. Thus, the flapper 32 moves to the second position 32b, at which the leading end portion thereof abuts against the stopper 35b, against a pressing force of the hinge coil spring 34, and then stops thereat. When the sheet S, recorded with information, is discharged while the flapper 32 is placed at said second position 32b, the sheet S is conveyed through the path indicated by the dashed and dotted arrow B (in FIG. 8) along the top surface of the flapper 32, and then stacked on the sheet tray 31.

The aforementioned pushing member 51 is pivotally rotatably mounted on the sheet tray 39. The sheets discharged onto the sheet tray 39 are pushed by the pushing member 51 against the sheet tray 39. Thus, even when the pressure plate 5 is pivotally rotated, the sheets stacked on the sheet tray 39 are prevented from being deviated therefrom or slipped thereoff. Consequently, good stacking ability is exhibited.

It is determined by the operational mode of the image forming apparatus 1 whether the recording sheet stacking portion or the sheet tray 39 is selected as the destination of a discharged sheet having an image formed on its surface. In the case of performing a printing operation of printing an image on a sheet in response to a facsimile reception and an image information transmission from a computer terminal, the discharge of such a sheet is performed by selecting the pressure plate 5 as the destination. On the other hand, in the case of forming an image on a sheet via the copying function of the apparatus, the discharge of such a sheet is performed by selecting the sheet tray 39 as the destination. In this manner, the destination of the discharged sheet is varied between the pressure plate 5 and the sheet tray 39. Additionally, the pressure plate 5 and the sheet tray 39 may be used for performing a sorting function of multiple types of copies.

Figure 9:
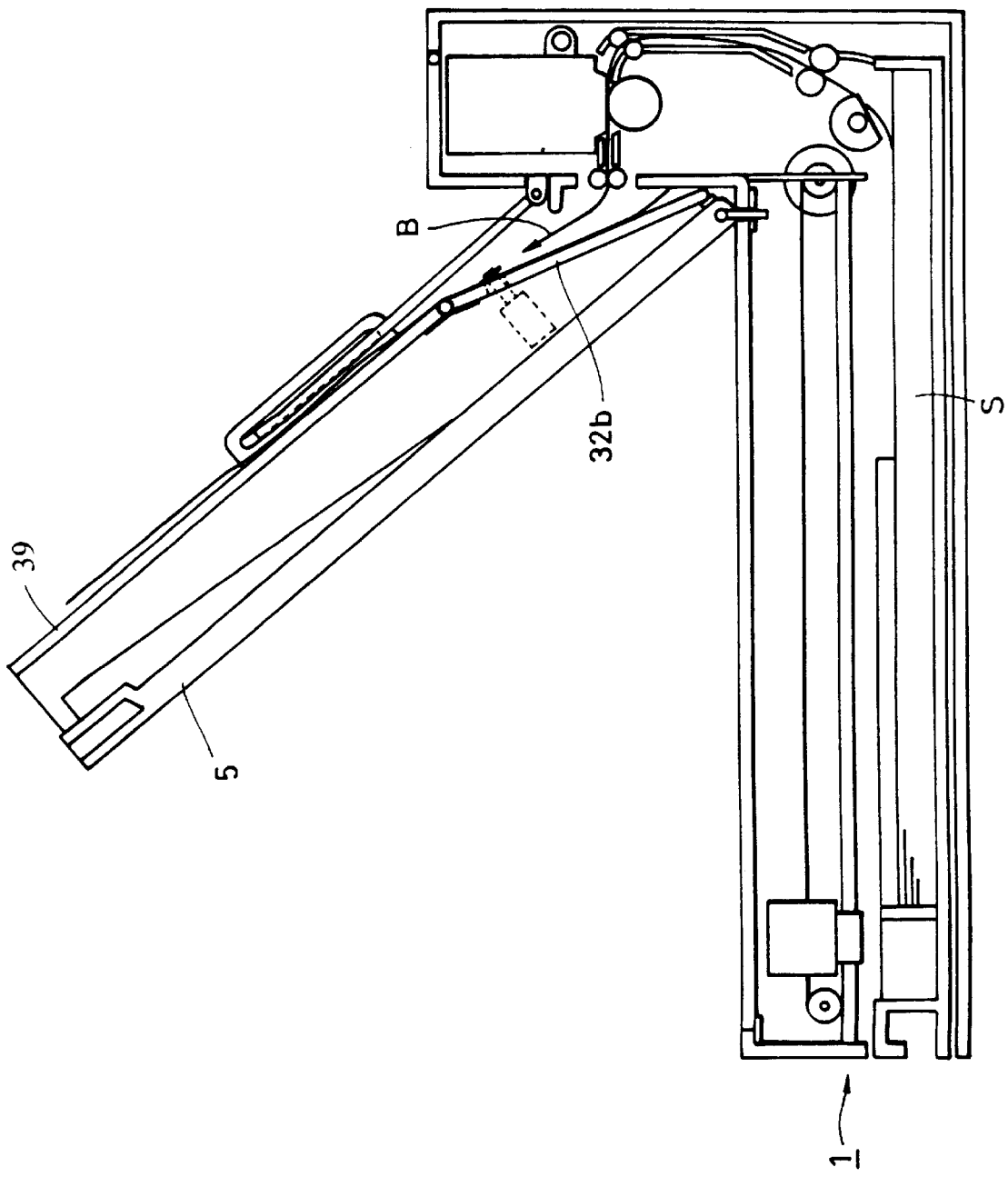

FIG. 9 is a diagram showing a state in which the pressure plate 5 is opened. When the image forming apparatus 1 is used as a copier or a scanner, the pressure plate 5 is opened pivotally. To smoothly perform an operation of switching the actuated flapper 32 in the aforementioned operation mode, an operation mode selecting signal is synchronized with an actuating signal for the solenoid 36. Then, the flapper 32 is controlled in such a manner as to move to the second position 32b. Thus this apparatus prevents occurrences of defective conditions as follows. The flapper 32 is prevented from interfering with the main unit of the apparatus when the pressure plate 5 is opened; as well, occurrence of a paper jam is prevented when sheets are discharged.

Moreover, the apparatus may comprise a pressure plate opening/closing sensor (not shown). Accordingly, the apparatus may be controlled so that the solenoid 36 is actuated in response to a detection signal produced by this sensor, and thus the flapper 32 would be moved to the second position 32b when ever the pressure plate 5 is opened.

In the apparatus of the aforementioned configuration, even when the pressure plate 5 is pivotally rotated and opened, the flapper 32 moves to the second position 32b. This enables the sheets to be conveyed in the direction indicated by the arrow B and then stacked on the sheet tray 31. As a result, the degrees of operability and convenience are increased.

It should be noted, that in the foregoing description of the embodiment of the present invention, the image forming apparatus was described as comprising a single sheet tray 39; in fact, the apparatus may have multiple sheet trays.

Figure 10:
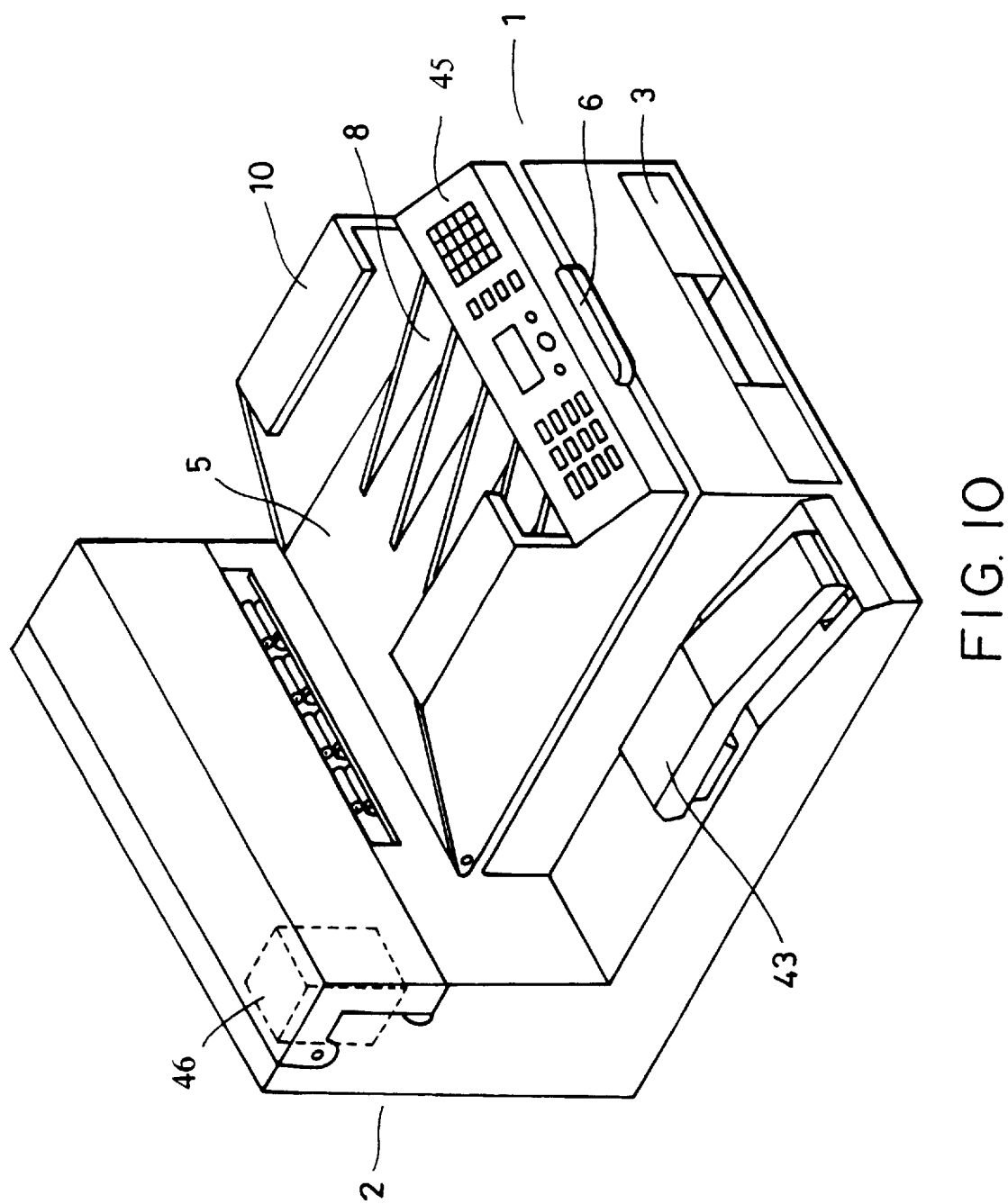
FIG. 10 is a perspective view showing the appearance of an image forming apparatus which embodies the present invention and which has a telephone function.

In the foregoing descriptions, the image forming apparatus embodying the present invention has been described in detail by using a plurality of modifications. Another embodiment of the present invention, in which a telephone function is imparted to such an image forming apparatus of the present invention, will be described with reference to FIG. 10, a perspective view showing the appearance of just such an image informing apparatus of the present invention.

In addition to containing the constituent elements of the aforementioned embodiments, the image forming apparatus of the present invention shown in this figure further has the following features: the operating portion 45 of the main unit thereof is provided in such a way as to be integral with the front-side upper part of the pressure plate 5; the handle 6 is placed under the front face of the operating portion 45; and a telephone handset 43 is disposed on the left side (as viewed in this figure) of the reading portion 1, in front of the ink cartridge standby portion 46 of the image forming portion 2. Incidentally, although the telephone handset 43 is usually disposed on the left side of the apparatus for right-handed operator convenience, the handset may be placed on the right side of the apparatus if the ink cartridge standby position is set to be on the right side of the image forming portion 2. In either of these cases, an efficient image forming apparatus is obtained by placing the handset 43 in the dead space corresponding to the difference in width between the reading portion 1 and the image forming portion 2.

The ease-of-use of the operating portion 45 is enhanced by inclining the operating portion 45 between the maximum height of the ribs 8, located towards the front of the apparatus, and the top surface of the pressure plate 5 at the front end of the apparatus so that the height of the operating portion 45 gradually decreases in the direction towards the front of the apparatus. Additionally, there is a space between the leading edge of a recording sheet and the operating portion 45. Thus, an operator can grasp the handle 6 without impediment. Finally, the operating portion 45 does thus not interfere with the operation of grasping the handle 6.

Incidentally, in the entire foregoing description of the image forming apparatus, it has been described such that the reading system using a contact image sensor is employed in the original reading portion 1. Alternatively, a reading system in which an optical mirror is moved, may be employed.

Although the preferred embodiments of the present invention have been described above, it should be understood that the present invention is not limited thereto and that other modifications will be apparent to those skilled in the art without departing from the spirit or scope of the invention.

The scope of the present invention, therefore, should be determined solely by the appended claims.

What is claimed is:

1. An image forming apparatus comprising:
   an original reading unit adapted to read an original image;
   a sheet supporting unit, placed under said original image reading unit adapted to support a sheet on which an image is formed;
   an image forming unit, placed on a side of said original reading unit and said sheet supporting unit adapted to form an image on a sheet held by said sheet supporting unit; and
   a sheet discharging unit adapted to discharge a sheet, on which an image is formed by said image forming unit, towards and above said original reading unit.

2. The image forming apparatus according to claim 1, wherein said original reading unit has:
- a cover member for pressing an original, which is placed on an original mount, against said original mount; and
- an optical unit adapted to read the original image by moving nearly horizontally with respect to the original which is placed on said original mount.

3. The image forming apparatus according to claim 2, wherein said cover member has a sheet stacking portion, provided on a sheet stacking surface thereof opposite to a surface thereof contacting an original placed on said original mount, for stacking a sheet discharged from said sheet discharging unit.

4. The image forming apparatus according to claim 3, wherein wall faces for guiding a sheet are provided on both end portions in a direction of sheet width of said sheet stacking portion of said cover member, and wherein said wall faces respectively each have eaves for guiding an upper surface of a stacking sheet.

5. The image forming apparatus according to claim 4, wherein said wall faces are formed so that a height thereof decreases towards the side of said sheet discharging unit.

6. The image forming apparatus according to claim 3, which further comprises a pressing member for pressing a sheet, which is stacked on the sheet stacking surface of said cover member, against the sheet stacking surface.

7. The image forming apparatus according to claim 6, wherein said pressing member has an end portion pivotally rotatably held at an upper portion of said sheet discharging unit.

8. The image forming apparatus according to claim 7, wherein the end portion of said pressing member, which is not held at said upper portion of said sheet discharging unit, is supported by a support member, provided on said sheet stacking surface, for supporting said pressing member so that said pressing member freely slides on the sheet stacking surface.

9. The image forming apparatus according to claim 8, wherein said support member has an engaging portion for engaging with said end portion of said pressing member, which is the said end portion not held at the upper portion of said sheet discharging surface.

10. The image forming apparatus according to claim 3, wherein said cover member has a link member, connected to said cover member and said original reading unit, for supporting said cover member so that said cover member can be upwardly displaced with respect to said original mount.

11. The image forming apparatus according to claim 10, wherein when said cover member is displaced by said link member upwardly with respect to said original mount, the highest position of said cover member is lower than the position of said sheet discharging unit.

12. The image forming apparatus according to claim 10, wherein said link member has a holding member for pressing said cover member toward said original mount.

13. The image forming apparatus according to claim 10, wherein said link member is freely attachably and detachably provided.

14. The image forming apparatus according to claim 10, wherein said cover member is adapted to move nearly in parallel with said original mount, and is supported by said link member.

15. The image forming apparatus according to claim 2, wherein said cover member is provided in such a manner as to be able to pivotally rotate about a pivotal-rotation fulcrum, which is provided at the side of said sheet discharging unit, in a direction in which said original mount is released, and wherein said cover member is adapted so that a sheet discharged from said sheet discharging unit is stacked thereon, even in a state in which said cover member is pivotally rotated.

16. The image forming apparatus according to claim 15, wherein a handle for pivotally rotating said cover member is provided on an end portion of said cover member, which is opposite to said pivotal-rotation fulcrum.

17. The image forming apparatus according to claim 16, wherein said cover member has a sheet stacking portion provided nearly parallel to a sheet discharging direction, in which a sheet is discharged from said sheet discharging unit, wherein said sheet stacking portion has ribs inclined so that the height of said ribs increases in said sheet discharging unit, and wherein each of said ribs is formed so that the height thereof at the front portion of said cover member, which is opposite to the pivotal-rotation fulcrum, is larger than the height of said handle.

18. The image forming apparatus according to claim 2, which further comprises:
- a sheet stacking portion for stacking a sheet discharged from said sheet discharging unit, said sheet stacking portion being provided on a surface of said cover member, which is opposite to an original holding surface thereof for pushing an original stacked on said original mount; and
- a sheet tray for stacking a sheet discharged from said sheet discharging unit, said sheet tray being provided above said cover member.

19. The image forming apparatus according to claim 18, wherein said sheet tray comprises:
- a stationary tray portion held and fixed onto said cover member; and
- a pivotal-rotation tray portion, held in such a manner as to be able to pivotally rotate around a center of pivotal rotation provided at an end portion of said stationary tray portion, which is at the side facing said sheet discharging unit, wherein said sheet tray is adapted to move to a first position when a pivotal-rotation-side end of said pivotal-rotation tray portion is placed higher than said sheet discharging unit, and to move to a second position when said pivotal-rotation-side end of said pivotal-rotation tray portion is placed lower than said sheet discharging unit.

20. The image forming apparatus according to claim 19, wherein said pivotal-rotation tray portion is pivotally rotated by a spring member, which is provided at an axis of pivotal-rotation, and a solenoid provided at said cover member.

21. The image forming apparatus according to claim 20, wherein a destination of a sheet, on which an image has been formed by said image forming unit, to be discharged is selected according to an operational mode of said image forming apparatus, and wherein said solenoid operates according to said operational mode and causes said pivotal-rotation tray portion to pivotally rotate.

22. The image forming apparatus according to claim 19, wherein when said pivotal-rotation tray portion is at the first position, said pivotal-rotation tray portion is controlled in such a manner as to be pivotally rotated from the first position to the second position in response to an operation of releasing said original mount by pivotally upwardly rotating said cover member.

23. The image forming apparatus according to claim 18, which further comprises a pressing member for pressing a sheet, which is stacked on said sheet tray, against said sheet tray.

24. The image forming apparatus according to claim 23, wherein said pressing member has an end portion pivotally rotatably held at an upper portion of said sheet discharging unit.

25. The image forming apparatus according to claim 24, wherein the end portion of said pressing member, which is not said held end portion thereof, is supported by a support member, provided on said sheet tray, for supporting said pressing member so that said pressing member is able to freely slide with respect to said sheet tray.

26. The image forming apparatus according to claim 24, wherein said supporting member has an engaging portion for engaging with the end of said pressing member, which is not held at said upper portion of said sheet discharging unit.

27. The image forming apparatus according to claim 1, wherein said image forming unit is an ink jet recording system adapted to form an image on a sheet surface by discharging ink.

28. The image forming apparatus according to claim 1, which further comprises a feeding/conveying unit, provided under said image forming unit, for feeding a sheet, which is supported by said sheet supporting unit, to said image forming unit.

29. The image forming apparatus according to claim 1, which further comprises an operating portion, provided in said original reading unit, for operating the image forming apparatus.

30. An image forming apparatus comprising:

an original reading unit adapted to read an image of an original;

a sheet supporting unit, placed under said original reading unit, for supporting a sheet on which an image is formed;

an image forming unit, placed at the back side of said original reading unit and said sheet supporting unit, adapted to form an image on a sheet supported by said sheet supporting unit;

a sheet discharging unit adapted to discharge a sheet, on which an image has been formed by said image forming unit, in a predetermined sheet discharging direction from a back side of said apparatus to a front side of said apparatus and to and above said original reading unit; and an operating unit, provided above said sheet supporting unit and towards the front side of said apparatus, for operating said apparatus.

31. The image forming apparatus according to claim 30, wherein said sheet supporting unit is a sheet cassette provided in such a manner as to be able to be freely attached to and detached from a main unit of said apparatus, and wherein the direction in which said sheet cassette is detached from said apparatus is identical with said sheet discharging direction.

32. The image forming apparatus according to claim 30, wherein said original reading unit has a cover member for holding an original placed on an original mount, and wherein said cover member is pivotally rotated around a pivotal-rotation fulcrum provided at a side of said image forming unit in such a manner so as to release said original.

33. The image forming apparatus according to claim 32, wherein said operating unit is provided at said cover member of said original reading unit.

34. The image forming apparatus according to claim 30, wherein said operating unit is provided at the front-side portion of said original reading unit.

* * * * *

UNITED STATES PATENT AND TRADEMARK OFFICE
CERTIFICATE OF CORRECTION

PATENT NO.   : 6,208,828 B1
DATED        : March 27, 2001
INVENTOR(S)  : Takashi Awai et al.

It is certified that error appears in the above-identified patent and that said Letters Patent is hereby corrected as shown below:

Column 1,
Line 58, "above described" should read -- above-described --.

Column 7,
Line 40, "their" should read -- their height --.

Column 8,
Line 16, "height" should read -- height at --; and
Line 62, "won" should read -- own --.

Column 12,
Line 64, "are" should be deleted.

Column 13,
Line 4, "tope" should read -- top --; and
Line 58, "subject" should read -- subjected --.

Column 14,
Line 4, "which" should read -- when --; and
Line 28, "not" should read -- do not --.

Column 15,
Line 13, "tray 31." should read -- tray 39. --;
Line 57, "when ever" should read -- whenever --; and
Line 63, "31." should read -- 39. --.

Signed and Sealed this

Eleventh Day of June, 2002

Attest:

Attesting Officer

JAMES E. ROGAN
*Director of the United States Patent and Trademark Office*